United States Patent [19]

Ohwaki et al.

[11] Patent Number: 4,745,142
[45] Date of Patent: May 17, 1988

[54] STAINPROOF POLYESTER FIBER

[75] Inventors: Shinji Ohwaki, Minoo; Togi Suzuki, Matsuyama; Shigenobu Kobayashi, Toyonaka, all of Japan

[73] Assignee: Teijin Limited, Osaka, Japan

[21] Appl. No.: 918,008

[22] Filed: Oct. 10, 1986

[30] Foreign Application Priority Data

Oct. 14, 1985 [JP] Japan .................. 60-226977
Jul. 29, 1986 [JP] Japan .................. 61-176566

[51] Int. Cl.⁴ .................. C08K 5/54; C08K 5/42; C08K 5/34; C08L 67/02
[52] U.S. Cl. .................. 524/87; 252/301.24; 252/301.28; 252/301.32; 524/157; 524/159; 524/166; 524/604; 524/605; 524/265; 525/408; 525/411; 525/437; 528/274
[58] Field of Search .............. 528/274; 525/408, 411, 525/437; 524/166, 157, 159, 87, 604, 605, 265; 252/301.24, 301.28, 301.32

[56] References Cited

U.S. PATENT DOCUMENTS

| 2,905,657 | 9/1959 | Huffman ................. 528/274 |
| 3,412,089 | 11/1968 | Ohkawa et al. ........... 252/301.24 |
| 3,538,057 | 11/1970 | Lafoe .................... 524/166 |
| 3,560,591 | 2/1971 | Tanaka et al. ............ 524/159 |
| 3,668,187 | 6/1972 | King et al. .............. 528/274 |
| 3,668,188 | 6/1972 | King et al. .............. 528/274 |
| 3,669,933 | 6/1972 | King et al. .............. 528/274 |
| 3,702,350 | 11/1972 | Kimura et al. ............ 524/157 |

Primary Examiner—Lewis T. Jacobs
Attorney, Agent, or Firm—Burgess, Ryan & Wayne

[57] ABSTRACT

A polyester fiber having a superior stainproof property comprises at least one fiber-forming polyester copolymer comprising a backbone polyester polymer and at least one type of terminal substituent which blocks at least some of the terminals of the molecules of the backbone polyester polymer and which substituent consists of a polyoxyalkyleneglycol monoether group of the formula (I):

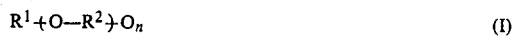

(I)

wherein $R^1$ is a monovalent organic radical free from active hydrogen atom, $R^2$ is an alkylene radical, and $\underline{n}$ is an integer of 2 or more.

15 Claims, No Drawings

STAINPROOF POLYESTER FIBER

BACKGROUND OF THE INVENTION

1. Field of the Invention

The present invention relates to a stainproof polyester fiber. More particularly, the present invention relates to a stainproof polyester fiber having an enhanced resistance to restaining while it is laundered or washed.

2. Description of the Related Arts

It is known that polyester fibers exhibit various excellent properties, for example, an excellent stability in dimension, a high mechanical strength, and a superior crease resistance, and therefore, are useful for various purposes.

However, it is also known that the polyester fibers are hydrophobic, and therefore, are easily stained with oil, which is difficult to remove, and are easily restained while being laundered or washed, in comparison with hydrophilic fibers, for example, cellulosic fibers.

This restaining phenomenon of the polyester fibers is an unsolved problem, known since the start of practical use of the polyester fibers in industry, and accordingly, various atempts have been made to eliminate the above-mentioned problem.

For example, Japanese Examined Patent Publication No. 47-2512 discloses a method for modifying a polyester fiber material by treating the polyester fiber material with an aqueous solution or dispersion of a copolymer of a polyoxyethyleneglycol with a polyester polymer, to enhance the hydrophilic property, stain proof property, and antistatic property thereof.

Japanese Examined Patent Publication No. 51-2559 discloses another method for modifying a synthetic fiber material by impregnating the synthetic fiber material with an aqueous solution of a hydrophilic vinyl monomer having a backbone segment consisting of a polyalkyleneoxide group and at least two terminal or side chain segments consisting of acrylate or methacrylate groups, and by polymerizing the hydrophilic vinyl monomer on the peripheral surfaces of the fibers in the synthetic fiber material at an elevated temperature, to enhance the hydrophilic property and antisatatic property of the synthetic fiber material.

Also, it is disclosed in Polymer, vol. 19, August, 1978, pages 908 to 912, that a polyester fiber material is treated by plasma initiated in various gases, for example, an oxygen-containing gas, to change the surface structure and wettability of the fiber material.

The above-mentioned known methods relate to finishing methods for modifying the polyester fiber material with a finishing agent. These known methods are disadvantageous in that the procedures are complicated, a specific apparatus is necessary, and reproductivity in effect is poor. Additionally, the known finishing methods are disadvantageous in that where the fiber materials are used in underwear or white clothes (e.g., hospital wear and uniforms) which are often laundered or washed, the finishing effect on the fiber material is gradually decreased with each repetition of the laundering or washing operation.

Accordingly, it is strongly desired to provide a new type of polyester fiber which has an excellent stainproof property durability and is not restained even when repeatedly laundered or washed.

Furthermore, it is known that the dyeability of polyester fibers can be improved by copolymerizing a polyester polymer with a polyoxyethyleneglycol. Thus, it was attempted to apply this idea to the improvement of the hydrophilic property and the stainproof property of the polyester fiber. As a result, it was found that, in order to obtain satisfactory levels of the hydrophilic property and the stainproof property, the polyoxyethyleneglycol must be copolymerized in a large amount of at least 10% by weight, preferably, at least 20% by weight, with the polyester polymer. This large amount of the copolymerized polyoxyethyleneglycol causes the resultant polyester copolymer fiber material to exhibit an unsatisfactorily decreased mechanical strength, an undesirably increased shrinkage in dimensions, and a deteriorated resistance to light. Therefore the resultant polyester copolymer fiber was useless for practical purposes, especially, for polyester fiber/cotton-blend fabrics which are used for linen articles. When the content of the copolymerized polyoxyethylene is reduced to 10% by weight or less, particularly 5% by weight or less, the resultant polyester copolymer fiber exhibited an unsatisfactory stainproof property.

SUMMARY OF THE INVENTION

An object of the present invention is to provide a stainproof polyester fiber having an enhanced resistance to restaining due to repeated laundering or washing.

Another object of the present invention is to provide a stainproof polyester fiber having an enhanced hydrophilic property and satisfactory mechanical properties.

The above-mentioned objects are attained by the stainproof polyester fiber of the present invention which comprises at least one fiber-forming polyester copolymer comprising:

a backbone polyester polymer; and at least one substituent which blocks at least a portion of terminals of the molecules of the backbone polyester moiety and which substituent consists of a polyoxyalkylene glycol group of the formula (I):

$$R^1-O+R^2+O)_n \quad \text{(I)}$$

wherein $R^1$ represents a monovalent organic radical free from active hydrogen atom, $R^2$ represents an alkylene radical, and n represents a positive integer of 2 or more.

In the polyester copolymer usable for the present invention, it is important that at least some of the terminals of the backbone polyester polymer molecules be blocked by the specific polyoxyalkyleneglycol group of the formula (I), and a terminal of the polyoxyalkyleneglycol group be blocked by a specific radical $R^1$ which is a monovalent hydrocarbon radical free from active hydrogen atom.

The above-mentioned specific polyester copolymer is highly effective for causing the resultant polyester fiber to exhibit an excellent stainproof property and a superior resistance to restaining while it is repeatedly laundered or washed, in comparison with those produced from a polyester copolymer in which a non-terminal-blocked polyoxyalkylene glycol is copolymerized with a backbone polyester polymer or from a blend of a polyester polymer with a two terminal-blocked polyoxyethyleneglycol or a polyoxyethylene glycol insoluble in the polyester-polymer.

DESCRIPTION OF THE PREFERRED EMBODIMENTS

The stainproof polyester fiber of the present invention comprises at least one specific polyester copolymer. This polyester copolymer comprises a backbone polyester polymer moiety and at least one specific substituent. That is, at least some of the terminals of the backbone polyester polymer molecules are blocked by the substituent consisting of a polyoxyalkyleneglycol monoether group of the formula (I):

$$R^1-O(-R^2-O)_n \qquad (I)$$

In the formula (I), it is important that $R^1$ be a monovalent organic radical free from active hydrogen atom, for example, a monovalent hydrocarbon radical selected from, for instance, the group consisting of alkyl, aryl, and alkylaryl radicals.

In the formula (I), $R^2$ is an alkylene radical, preferably having 2 to 4 carbon atoms, and is selected, for example, from ethylene, propylene, and tetramethylene radicals. The polyoxyalkylene glycol monoether group of the formula (I) may have two or more different alkylene radicals represented by $R^2$, for example, ethylene and propylene radicals.

In the formula (I), n is an integer of 2 or more, preferably, 20 or more, more preferably, 20 to 140, still more preferably, 30 to 140.

In view of the formula (I), the polyoxyalkyleneglycol monoether group usable for the present invention must be a one terminal-blocked polyoxyalkyleneglycol group having a blocking terminal radical $R^1$ free from active hydrogen atom.

The one terminal-blocked polyoxyalkyleneglycol usable for the present invention is preferably selected from the group consisting of polyoxyethyleneglycolmonomethylether, polyoxyethyleneglycolmonophenylether, polyoxyethyleneglycolmonooctylphenylether, polyoxyethyleneglycolmonononylphenylether, polyoxyethyleneglycolmonocetylether, polyoxypropyleneglycolmonophenylether, polyoxypropyleneglycolmonooctylphenylether, polyoxypropyleneglycolmonononylphenylether, polyoxypropyleneglycolmonocetylphenylether, polyoxytetramethyleneglycolmonomethylether, monomethylethers of polyoxyethyleneglycol-polyoxypropyleneglycol copolymers.

In the polyester copolymer usable for the present invention, the backbone polyester polymer is selected from polymerization products of a dicarboxylic acid component with an alkylene glycol component. The dicarboxylic acid component usually comprises 90 to 100 molar % of terephthalic acid and 0 to 10 molar % of at least one additional difunctional acid. The additional difunctional acid is preferably selected from the group consisting of aromatic difunctional acids, for example, isophthalic acid, 5-sodium sulfo-isophthalic acid, naphthalene dicarboxylic acids, diphenyl dicarboxylic acids, diphenoxyethane dicarboxylic acids, β-hydroxyethoxybenzoic acid, and p-hydroxybenzoic acid; aliphatic difunctional acids, for example, sebacic acid, adipic acid, and oxalic acid; and cycloaliphatic difunctional acids, for example, 1,4-cyclohexane dicarboxylic acid.

The alkylene glycol component usually comprises 90 to 100 molar % of at least one alkylene glycol having 2 to 6 carbon atoms, selected from, for example, ethylene glycol, trimethyleneglycol, tetramethylene glycol, pentamethyleneglycol, and hexamethylene glycol, and 0 to 10 molar % of at least one additional diol compound.

The additional diol compound is preferably selected from the group consisting of aliphatic diol compounds, for example, neopentylglycol; aromatic diol compounds, for example, bisphenol A and bisphenol S; cycloaliphatic diol compounds, for example, cyclohexane-1,4-dimethanol; and polyoxyalkylene glycol in which two terminals thereof are not blocked.

The polyester copolymer usable for the present invention can be produced by any known two step process comprising a first step in which a glycol ester of a dicarboxylic acid or its oligomer is produced, and a second step in which the glycol ester of dicarboxylic acid or its oligomer is polymerized to provide a polyester.

For example, in the first step, a dicarboxylic acid component consisting of, for example, terephthalic acid, is directly esterified with a glycol component consisting of, for example, ethylene glycol, to provide a glycol ester of the dicarboxylic acid or its oligomer. In another first step, a lower alkyl ester of a dicarboxylic acid, for example, dimethyl terephthalate, is subjected to a ester exchange reaction with a glycol compound, for example, ethylene glycol.

In still another first step, a dicarboxylic acid component, for example, terephthatic acid, is directly reacted with an alkylene oxide, for example, ethylene oxide.

In the second step, the glycol ester of dicarboxylic acid or its oligomer is subjected to a polymerization procedure at an elevated temperature under a reduced pressure.

In the production of the polyester copolymer, at least some of the terminals of the backbone polyester polymer molecules are blocked by the polyoxyalkyleneglycol monoether group of the formula (I). This blocking reaction is effected, in at least one stage in the above-mentioned process for producing the backbone polyester polymer, for example, in any of at least one stage before, during or after the first step, or in any of at least one stage during the second step.

The amount of the polyoxyalkyleneglycol monoether group to be contained in the polyester copolymer is variable depending on the intended stainproof property of the polyester fiber. Usually, the content of the polyoxyalkyleneglycol monoether group in the polyester copolymer is preferably in the range of from 0.01 to 4.0 molar %, more preferably from 0.1 to 3.0 molar %, based on the molar amount of the dicarboxylic acid component used for the preparation of the backbone polyester polymer. When the content of the polyoxyalkyleneglycol monoether group is less than 0.01 molar %, the resultant polyester fiber sometimes exhibits an unsatisfactory stainproof property and resistance to restaining while having laundered or washed. When the content of the polyoxyalkyleneglycol monoether group is more than 4.0 molar % or more, sometimes the polymerization of the glycol ester of the dicarboxylic acid or oligomer thereof is hindered, and therefore, the resultant polyester fiber sometimes exhibits unsatisfactory mechanical properties, for example, tensile strength and a decreased resistance to light.

Also, preferably the amount of the polyoxyalkyleneglycol monoether group in the polyester copolymer is in the range of 0.5 to 10%, more preferably 2 to 5%, based on the weight of the polyester copolymer.

Generally, so long as the resultant polyester copolymer fiber exhibits a satisfactory stainproof property, preferably the content of the polyoxyalkyleneglycol monoether group in the polyester copolymer is as small as possible.

The stainproof polyester fiber can contain, in addition to the polyester copolymer, an additive consisting of at least one member selected from stabilizers, delustering agents, antioxidants, flame retardants, antistatic agents, fluorescent brightening agents, catalysts, anti-discoloring agents, coloring agents, and inorganic fillers.

Especially, when the polyester copolymer is exposed to a high temperature, for example, in a melt spinning procedure, the polyoxyalkyleneglycol monoether groups sometimes are easily oxidized and the degree of polymerization thereof is thus decreased and the resultant fiber discolored. Accordingly, preferably the polyester copolymer is blended with a antioxidant and/or a fluorescent brightening agent. Also, preferably the polyester copolymer is blended with an antistatic agent to provide an antistatic polyester fiber.

The polyester copolymer usable for the present invention preferably has an inherent viscosity of 0.58 or more, more preferably 0.6 or more.

The polyester copolymer is converted to a fiber, usually by a melt-spinning procedure which is preferably carried out at a take up speed of about 1000 m/min. The fiber is either a regular (circular cross-sectional) fiber, irregular (non-circular cross-sectional) fiber, or hollow fiber. The melt-spun polyester fiber is, if necessary, oriented to provide oriented polyesters fibers having a tensile strength of 4 g/d and an ultimate elongation of 40% or less, and then, if necessary, heat-treated to cause the oriented fiber to exhibit a satisfactory dimensional stability and crystallinity.

Preferably, the stainproof polyester fiber of the present invention has a crystal size at the (100) plane of 50 to 100 angstroms and a crystal size at the (010) plane of 65 to 170 angstroms. Also, preferably the stainproof polyester fiber of the present invention exhibits a birefringence of 0.15 or more, more preferably, from 0.15 to 0.18.

When any one of the crystal sizes at the (100) and (010) planes falls outside of the above-mentioned ranges, the resultant polyester fiber will exhibit an unsatisfactory stainproof property and resistance to restaining while being laundered or washed. Also, when the birefringent is less than 0.15, the crystal size of the resultant polyester fiber at the (010) plane will fall outside of the range of from 65 to 170 angstroms and, therefore, the resultant polyester fiber will exhibit an unsatisfactory stainproof property. When the birefringence is more than 0.18, the polyester copolymer may sometimes exhibit an unsatisfactory fiber-productivity.

In the production of the stainproof polyester fiber of the present invention, preferably the drawn fiber is heat-treated at an elevated temperature which is high enough to impart a satisfactory crystallinity to the fiber. For example, a polyethylene terephthalate fiber is crystallized at a temperature of 160° C. or more, and the crystallization is significantly promoted at a temperature of 175° C. or more. Therefore, preferably the polyethylene terephthalate fiber is heat treated at a temperature of 175° C. or more, more preferably 180° C. or more, still more preferably 190° C. or more. However, when the heat treatment is applied at an excessively high temperature, the resultant polyester fiber exhibits deteriorated properties. Therefore, preferably the heat treatment is carried out at a temperature not exceeding 240° C., more preferably not exceeding 220° C. The heat treatment can be applied to the polyester fiber before it is converted to a yarn or fabric, or to a polyester fiber yarn or fabric. Also, the heat treatment can be applied to the polyester fiber, yarn or fabric while it is relaxed, or the dimension thereof is fixed under tension.

Generally, the heat treatment is preferably carried out at a temperature for the time period satisfying the inequality:

$$1000/(T-175)^2 < t < 30000/(T-175)^2$$

where T represents a heat treatment temperature in °C. and t represents a heat treatment time in seconds.

When the heat treatment time $t$ is less than $1000/(T-175)^2$ seconds, the resultant heat treated fiber exhibits an unsatisfactory crystallinity. When the heat treatment time $t$ is more than $30000/(T-175)^2$ seconds, the resultant heat treated fiber exhibits deteriorated physical and mechanical properties.

More preferably, the heat treating time $t$ satisfies the inequality:

$$1000/(T-175)^2 < t < 3000/(T-175)^2$$

The heat-treated stainproof polyester fiber of the present invention has a high hydrophilic property and exhibits a high affinity to various hydrophilic coating resinous materials, preferably a polyether resinous material which can significantly promote the stainproof property and resistance to restaining while being laundered or washed.

The reason why the polyester fiber of the present invention exhibits a higher level of stainproof property than that of conventional polyester fiber has not yet been completely clarified, but is assumed to be as follows.

It is known that the conventional polyester fiber is hydrophobic and lipophilic and, therefore, exhibits a high affinity to oil staining. That is, conventional polyester fiber easily absorbs oily substances and the absorbed oil stain is not easily removed even when laundered or washed. In this case, the oil stain in the polyester fiber cause the fiber to be discolored grey and then darkened.

It was found that the oil stain is not evenly distributed in the fiber. For example, when the polyester fiber is composed of crystalline portions and amorphous portions, the polyester molecules in the crystalline portions are arranged at a higher density than in the amorphous portions to form crystal lattice having distances between the polyester molecules on the order of several angstroms. The oily substance can not penetrate the crystal lattice.

In the amorphous portions or gaps formed between the crystal micelles, the polyester molecules are arranged at a low density. This low density structure allows the oily substance to penetrate the amorphous portions and the gaps between the crystal micelles in the polyester fiber. The penetrated oily substances are firmly absorbed by the polyester fibers due to the high affinity of the polyester fiber to the oily substance.

Accordingly, it was assumed by the inventors of the present invention that the penetration of the oily substance can be prevented by making the amorphous portions and gaps between the crystal micelles in the polyester fiber hydrophilic, to thereby lose their affinity to the oily substance.

Under the above-mentioned assumption, a study was made of how to modify the polyester fiber. For example, a modified polyester fiber was prepared from a blend of a polyester polymer with a polyoxyalkyleneglycol having two terminals thereof blocked with blocking radicals having no active hydrogen atom. The modified polyester fiber exhibited an enhanced stainproof property in the initial stage of use thereof, but the stainproof property rapidly decreased with repeated usage and laundering. That is, the durability of the stainproof property of the polyester fiber was poor.

In order to clarify the reasons for the decreased stainproof property, the modified polyester fiber was immersed in boiling water under a high pressure. As a result, it was found that the two terminal-blocked polyoxyalkylene glycol was easily extracted by the boiling water.

In another attempt, a polyester polymer was copolymerized with a polyoxyalkylene glycol having two terminals thereof having an active hydrogen. The intended copolymerization was easily carried out. However, the resultant polyester copolymer exhibited a poor crystallinity and, therefore, the resultant polyester fiber exhibited a poor stainproof property. This is assumed to be because the blocking polyoxyalkylene glycol terminal radicals are evenly randomly distributed throughout the polyester fiber and, therefore, could not be effectively concentrated in the amorphous portions of the polyester fiber.

Recently, various types of block copolymers and grafted copolymers consisting of two or more different block moieties have been developed. For example, "Hyomen", vol. 22, No. 6, page 297 (1984) and "Kogyo Zairyo". vol. 33, No. 12, page 46 (1985) disclose various high polymeric surface-active agents and high polymeric surface-modifying agents, and the utilization thereof.

When a hydrophilic polyoxyalkyleneglycol (PAG) having a terminal thereof having an active hydrogen atom and the other terminal thereof blocked with a radical free from the active hydrogen atom is block copolymerized with a hydrophobic polyester polymer (PE), the resultant polyester copolymer contains PAG-PE-PAG block polymer molecules and PAG-PE block polymer molecules distributed in major polyester polymer molecules. In this type of polyester copolymer, the PAG segments are easily coagulated and, therefore, the polyester copolymer has PGA-coagulated segments and PE-coagulated segments. That is, the polyester block copolymer exhibited a polymeric micell structure.

Table 1 shows various properties of three different types of polyester block copolymers containing polyoxyethylene glycol block segments.

The polyester block copolymer No. 1 was prepared by the copolymerization of a polyethylene terephthalate polymer with 5% by weight of polyoxyethyleneglycol provided with two terminals thereof containing active hydrogen atoms and having a molecular weight of 2000.

The polyester copolymer No. 2 was prepared by copolymerization of a polyethylene terephthalate polymer with 5% by weight of a one terminal blocked polyoxyethyleneglycol provided with one terminal thereof containing active hydrogen atoms and the other one terminal thereof free from active hydrogen atom and having a molecular weight of 2000.

The polyester block copolymer No. 3 consisted of a blend of a polyethylene terephthalate polymer with 5% by weight of a two terminal blocked polyoxyethyleneglycol provided with two terminals thereof free from an active hydrogen atom and having a molecular weight of 2000.

The polyester polymer No. 4 is a non modified polyethylene terephthalate homopolymer.

TABLE 1

| Polymer No. | Type of Polymer PEG attached | Tg (°) | Tm (°C.) |
|---|---|---|---|
| 1 | Copolymer of PET with PEG having active hydrogen atom containing two terminals | 63.0 | 247.2 |
| 2 | Copolymer of PET with PEG one terminal blocked PEG | 63.7 | 253.3 |
| 3. | Blend of PET with PEG having active hydrogen atom-free two terminals | 70.8 | 254.8 |
| 4 | — | 69.3 | 254.3 |

Note:
PEG: Polyoxyethyleneglycol
PET: Polyethyleneterephthalate
Tg: Glass transition point
Tm: Melting point In Table 1, the Tg (glass transition point) and Tm (melting point) of the polymers were determined by means of a differential calorimeter.

The polymers Nos. 1 and 2 have a relatively low glass transition point (Tg) of about 63° C. and, therefore, can exhibit molecular motion at a relatively low temperature. Polymer Nos. 3 and 4 have a relatively high glass transition point (Tg) of about 70° C.

Since the polyoxyethyleneglycol having a molecular weight of 2000 is in a liquid state at room temperature, it is assumed that the relative low glass transition point of polymer Nos. 1 and 2 is derived from the block copolymerization of the above-mentioned specific polyoxyethyleneglycol with the backbone polyester polymer.

Also, it can be seen from Table 1 that polymer No. 1 has a relatively low melting point of about 247° C., and polymer Nos. 2, 3, and 4 have a relatively high melting point of about 253°–255° C. From the above, it is assumed that polymer No. 2 is composed of backbone polyester polymer segments and polyoxyethyleneglycol monoether groups which are attached to the backbone polyester polymer, which have a terminal free from an active hydrogen atom. The polyoxyethyleneglycol monoether segments exhibit a high molecular motion at a relatively low temperature. That is, in polymer No. 2, the backbone polyester polymer segments are concentrated in cyrstalline blocks and the polyoxyethyleneglycol segments are concentrated in amorphous blocks. That is, polymer No. 2 has a two block micelle structure similar to that of the high polymeric surface active agent.

From the above, it was found, for the first time, by the inventors of the present invention that the specific type of polyester copolymer is extremely useful for producing a polyester fiber having a high stainproof property and an excellent stainproof property durability.

That is, in the present invention, it is important that a specific polyoxyethyleneglycol having an active hydrogen atom-containing terminal and an active hydrogen atom-free terminal thereof is attached to some of the terminals of backbone polyester polymer molecules. The resultant polyester copolymer has specific terminals of the formula (I) containing an active hydrogen atom-free radical represented by $R^1$.

In the polyester copolymer fiber of the present invention, preferably the polyoxyalkylene glycol terminal chains are concentrated in the amorphous segments of the fiber, and the backbone polyester polymer chains are concentrated in the crystalline segments of the fiber, to form a two block segment-containing micelle structure. In order to promote the above-mentioned concentrations, preferably the crystallization of the backbone polyester polymer chains is accelerated by a heat treatment. The polyoxyalkylene glycol compounds having a molecular weight of 500 to 5000 are usually non-crystalline and, therefore, in a liquid or waxy state at room temperature. Therefore, the polyoxyalkylene glycol terminal chains are usually not crystallized and easily form amorphous segments in the fiber.

In the stainproof polyester fiber of the present invention, it was found that the specific polyoxyalkylene glycol monoether terminal chains of the formula (I) are effective for promoting the crystallization of the backbone polyester polymer chains in the fiber-forming procedures and in the heat treatment procedure.

Referring to Table 1, copolymer No. 2 consisting of PET backbone chains and PEG terminal chains terminated with active hydrogen atom-free terminal radicals represented by $R^1$ in the formula (I), can be converted to a fiber having a high crystallinity, a large crystal size, a small birefringence Δn, and a small specific gravity. These properties suggest that the fiber has approximately completed crystalline segments consisting of the backbone polyester polymer chains and highly amorphous segments consisting of the polyoxyethyleneglycol terminal chains.

The backbone polyester polymer crystalline segments do not allow stain to penetrate therein. Also, the polyoxyalkyleneglycol amorphous segments, which are highly hydrophilic and lipophobic, do not allow oil to penetrate therein. Even if the oil penetrates the amorphous segments, it can be easily separated from the polyoxyalkyleneglycol chains by laundering or washing with water.

The polyester fiber of the present invention may be treated with a conventional stainproof agent. Alternatively, the polyester copolymer usable for the present invention may be blended with a conventional stainproof agent. The stainproof agent usually has hydrophilic group and is effective for enhancing the stainproof property of the polyester fiber of the present invention.

In the stainproof polyester fiber of the present invention, the specific polyester copolymer can be blended with at least one organic polysiloxane compound, to enhance the stainproof property and the durability thereof.

Preferably, the organic polysiloxane compound is selected from, for example, dimethyl polysiloxane, methylethyl polysiloxane, methylpropyl polysiloxane, methylbutyl polysiloxane, methylamyl polysiloxane, methylhexyl polysiloxane, methyloctyl polysiloxane, methyldecyl polysiloxane, methyldodecyl polysiloxane, methyltetradecyl polysiloxane methylphenyl polysiloxane, diphenyl polysiloxane, and copolymers of the above-mentioned compounds.

Preferably, the organic polysiloxane compound usable for the present invention has a molecular weight of 100,000 or less, more preferably 50,000 or less. When the molecular weight is more than 100,000, the organic polysiloxane compound may exhibit an unsatisfactory dispersing property in the polyester copolymer, and an unsatisfactory effect for improving the stainproof property for the resultant polyester fiber.

Also, preferably the organic polysiloxane compounds have a viscosity of 10,000 cSt. or less, more preferably 5,000 cSt. or less, determined at a temperature of 25° C.

The organic polysiloxane compounds usable for the present invention further include, in addition to the above-mentioned compounds, polyether-modified silicone oil of the formula (II)

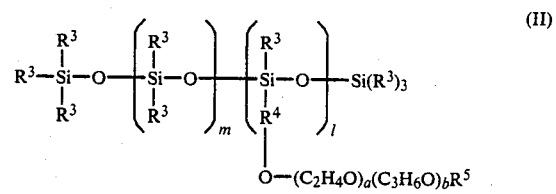

where $R^3$ and $R^4$ respectively represent a lower alkyl radical having 1 to 4 carbon atoms, $R^5$ represents a member selected from the group consisting of a hydrogen atom and lower alkyl radicals having 1 to 20 carbon atoms, $\underline{m}$ and $\underline{l}$ respectively represent zero or an integer of 1 or more, and $\underline{b}$ and $\underline{a}$ respectively represent an integer of 1 or more.

Preferable polyether-modified silicone oils are of the formula (III):

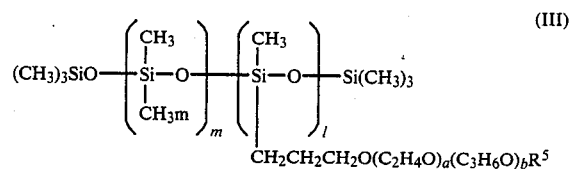

The polyether-modified silicone oils of the formula (III) are available under the trademarks of Silicone KF-351, Silicone KF-352, and Silicone KF-353, which are produced by the Shinetsu Chemical Co. The silicones KF, 351, 352, and 353 have the structures and viscosities at 25° C. as shown in Table 2.

TABLE 2

| Silicone | m + l | l/m + l | a + b | a/b | Viscosity (cSt.) |
|---|---|---|---|---|---|
| KF-351 | 1 to 30 | 0.3 to 1 | 5 to 15 | approximately 100/0 | 100 |
| KF-352 | 20 to 100 | 0.1 to 0.2 | 30 to 60 | approximately 50/50 | 1600 |
| KF-353 | 1 to 30 | 0.05 to 0.3 | 3 to 10 | 100/0 | 400 |

The organic polysiloxane is added to the polyester copolymer at any of at least one stage before the fiber-forming procedure is completed, for example, before, during or after the first esterification step, or during the second polymerization step.

Usually, the organic polysiloxane is added in an amount of 0.001% by weight or more, but not exceeding 0.5% by weight, to the polyester copolymer.

When the content of the organic polysiloxane is less than 0.001%, the resultant polyester fiber exhibits an unsatisfactory stainproof property and stainproof property durability. Also, if the organic polysiloxane is used in a large amount of more than 0.5% by weight, the resultant polyester copolymer blend exhibits an unsatisfactory fiber-forming property and drawability.

The stainproof polyester fiber of the present invention may contain 0.01% to 2.0%, based on the weight of the backbone polyester polymer, of an antistatic agent consisting of at least one member selected from the group consisting of quaternary onium salts of sulfonic acids and metal salts of sulfonic acids which are not reactive with the backbone polyester polymer.

The quaternary onium salts of sulfonic acids include quaternary phosphonium salts and quaternary ammonium salts of sulfonic acids.

The quaternary onium salts of sulfonic acids usable for the present invention may be of the formula (IV):

$$[R^6-SO_3^-]Q^+ \qquad (IV)$$

where $R^6$ represents a member selected from the group consisting of alkyl radicals having 3 to 30 carbon atoms and aryl and alkylaryl radicals having 7 to 40 carbon atoms, and $Q^+$ represents a quaternary onium ion.

In the formula (IV), the alkyl radical and the alkyl radical in the alkylaryl radical represented by $R^6$ may be in the form of a straight chain or a branched chain. The quaternary onium ion represented by $Q^{30}$ is preferably selected from quaternary phosphonium ion, quaternary ammonium ion, quaternary sulfonium ion, quaternary carbonium ion, and quaternary oxonium ion, preferably quaternary phosphonous ion and quaternary ammonium ion, more preferable quaternary phosphonium ion.

The preferable quaternary phosphonium ion and quaternary ammonium ion are respectively represented by the formula:

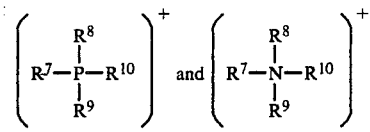

wherein $R^7$, $R^8$, $R^9$ and $R^{10}$ respectively represent, independently from each other, a member selected from alkyl, cycloalkyl, aryl, and alkylaryl radicals, and substituted derivatives of the above-mentioned radicals. The radicals $R^9$ and $R^{10}$ may be connected to form a cyclic radical.

The quaternary onium salts of sulfonic acids preferably include tetramethylphosphonium salts, tetraethylphosphonium salts, tetrapropylphosphonium salts, tetraisopropylphosphonium salts, tetrabutylphosphonium salts, butyltriphenylphosphonium salts, hexadecyltributylphosphonium salts, ethyltrihexylphosphonium salts, cyclohexyltributylphosphonium salts, benzyltributylphosphonium salts, tetraphenylphosphonium salts, octyltrimethylphosphonium salts, octyldimethylbenzylphosphonium salts, lauryldimethylbenzylphosphonium salts, stearyltrimethylphosphonium salts, lauryltrimethylphosphonium salts, laurylbenzenetrimethylphosphonium salts, lauryldimethyl-o-chlorobenzylphosphonium salts, stearylethyldihydroxyethylphosphonium salts, tetramethylammonium salts, tetraethylammonium salts, tetrapropylammonium salts, tetraisopropylammonium salts, tetrabutylammonium salts, and tetraphenylammonium salts of stearylsulfonic acid, octylsulfonic acid, dodecylsulfonic acid, mixtures of at least two of alkylsulfonic acids having carbon atoms in an average number of 14, and hard type and soft type dodecylbenzenesulfonic acids.

The metal salts of sulfonic acids having no ester-forming property and usable for the present invention may be selected from, for example, quaternary onium metal salts of sulfonic acid of the formula (V):

$$R^{11} SO_3 M \qquad (V)$$

wherein $R^{11}$ represents a member selected from alkyl radicals having 3 to 30 carbon atoms and aryl and alkylaryl radicals having 7 to 40 carbon atoms, and M represents a metal atom selected from alkali metals and alkaline earth metals.

In the formula (V), the alkyl radical and the alkyl radical in the alkylaryl radical may be either in the form of a straight chain or a branched chain.

Also, in the formula (V), the metal atom represented by M may be selected from alkali metal atoms such as sodium, potassium and lithium atoms, and alkaline earth metal atoms such as magnesium and calcium atoms. The metal represented by M is preferably a lithium, sodium or potassium atom.

The preferred metal salts of sulfonic acids usable for the present invention are selected from, for example, sodium stearylsulfonate, sodium octylsulfonate, sodium dodecylsulfonate, sodium salts of mixtures of at least two alkylsulfonic acids having an average number of carbon atoms of 14, sodium salts of hard type and soft type dodecylbenzenesulfonic acids, lithium salts of hard type and soft type dodecylbenzenesulfonic acids, and magnesium salts of hard type and soft type dodecylbenzenesulfonic acids.

As stated above, the content of the antistatic agent consisting of at least one member selected from quaternary onium salts and metal salts of sulfonic acids in the polyester fiber is preferably in the range of from 0.01% to 2.0% based on the weight of the backbone polyester polymer. When the content of the antistatic agent is less than 0.01% by weight, the resultant polyester fiber exhibits an unsatisfactory antistatic property even if the content of the polyoxyalkylene glycol radicals of the formula (I) is sufficiently high. That is, only when the antistatic agent is used in a content of 0.01% by weight or more does the antistatic agent cooperate with the polyoxyalkyleneglycol radicals of the formula (I) to enhance the antistatic property of the resultant polyester fiber. The antistatic effect of the polyester fiber increases with the increase in the content of the antistatic agent, but this effect usually saturates at a content of the antistatic agent to about 2.0% by weight. An excessive content more than 2.0% by weight of the antistatic agent does not effectively increase the antistatic property of the polyester fiber. Also, an excessive content of the antistatic agent causes the resultant polyester fiber to exhibit a reduced mechanical strength and a decreased resistance to alkali, and to undesirably promote fibrillization of the fiber.

The above-mentioned specific antistatic agent can be mixed with the polyester copolymer at any one or more stages before the fiber-forming procedures are completed, for example, after, during or before the first esterification step is carried out, during or after the second polymerization procedure is carried out, and while the polymer is in a molten or powder state.

When the antistatic agent is added to the polyester copolymer before the middle stage of the second polymerization step, the antistatic agent may be used in the state of a solution or dispersion in a liquid medium, for example, a glycol compound.

The stainproof polyester fiber of the present invention may contain, in addition to the specific polyester copolymer, a fluorescent brightening agent consisting of at least one stilbene compound of the formula (VI):

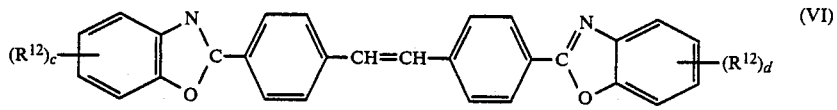

where $R^{12}$ and $R^{13}$ respectively represent a member selected from the group consisting of a hydrogen atom, halogen atoms, alkyl radicals, alkoxy radicals and aryl radicals, and c and d respectively represent an integer of 1 to 2.

Preferably, the fluorescent brightening stilbene compounds of the formula (VI) are selected from 4,4′-bis(-benzoxazolyl) stilbene, e,4′-bis(5-methylbenzoxazolyl) stilbene, 4-(benzoxazolyl)-4′-(5-methylbenzoxazolyl) stilbene, 4,4′-bis(5,6-dimethylbenzoxazolyl) stilbene, 4,4′-bis(5-phenylbenzoxazolyl) stilbene, 4,4′-bis(5-benzylbenzoxazolyl) stilbene, 4,4′-bis(5-chlorobenzoxazolyl) stilbene, 4,4′-bis(5-bromobenzoxazolyl) stilbene, and 4,4′-bis(5-methoxybenzoxazolyl) stilbene.

The fluorescent brightening agent can be added at any one or more stages in the polyester copolymer-preparing procedures and the polyester fiber producing procedures, for example, before, during and after the polyester copolymer-preparation procedures. Preferably the fluorescent brightening agent is blended with the polyester copolymer after the polyester copolymer preparation is completed but just before the polyester copolymer is melt-spun, to prevent thermal deterioration of the fluorescent brightening agent.

The fluorescent brightening agent is usually used in an amount of from 0.001% to 2.0%, preferably from 0.01 to 1%, based on the weight of the backbone polyester polymer.

When the content of the fluorescent brightening agent is less than 0.001% by weight, the resultant polyester fiber exhibits an unsatisfactory stainproof property and stainproof property durability. Also, an excessive amount of the fluorescent brightening agent more than 2% by weight does not effectively enhance the stainproof property and durability thereof of the resultant polyester fiber, and results in an decreased fiber-forming property and drawability of the polyester copolymer blend.

The fluoroscent brightening agent useful for the specific polyester copolymer is limited to the stilbene compounds of the formula (VI).

A fluorescent brightening triazinyl stilbene compound of the formula:

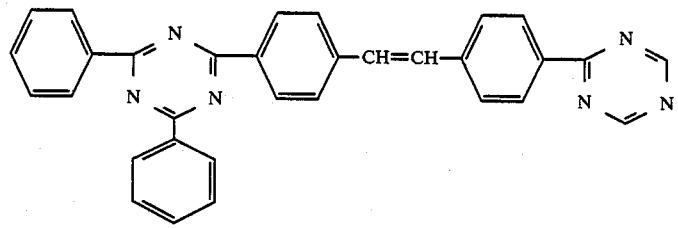

does not effectively enhance the waterproof property of the polyester fiber of the present invention.

The reasons why only the stilbene compounds of the formula (VI) are effective for enhancing the stainproof property are not clear, but it is assumed that the stilbene compounds of the formula (VI) are synergistic in enhancing the stainproof property with the polyoxyalkylene glycol terminal radicals in the polyester copolymer, for an as yet unclarified reason.

The stainproof polyester fiber of the present invention may be coated with a hydrophilic resinous material. The hydrophilic resinous material usable for the present invention is not limited to a specific type of resinous material so long as it is effective for forming a coating membrane and for increasing the stainproof property of the polyester fiber. However, preferably the hydrophilic resinous material comprises at least one polyether resin. The polyether resin includes, for example, polyether-polyester block copolymer resins and vinyl copolymer resins containing polyether polymer segments.

Preferably, the polyether-polyester block copolymer resin comprises a dicarboxylic acid component consisting of terephthalic acid and/or isophthalic acid, alkylene glycol components and an polyoxyalkyleneglycol component copolymerized with each other. For example, the polyester-polyether block copolymer is preferably selected from the group consisting of terephthalic acid—alkylene glycol—polyoxyalkylene glycol block copolymers, terephthalic acid—isophthalic acid—alkylene glycol—polyoxyalkylene glycol block copolymers, terephthalic acid—alkylene glycol—polyoxyethylenealkylene glycol monoether block copolymers, and terephthalic acid—isophthalic acid—alkylene glycol—polyoxyalkylene glycolmonoether block copolymers. Usually, in the polyether—polyester block copolymer, preferably the molar ratio of terephthalic acid to isophthalic acid is in a range of from 100:0 to 50:50, more preferably, 90:10 to 50:10, and the molar ratio of the dicarboxylic acid component (terephthalic acid and/or isophthalic acid) to the polyoxyethyleneglycol is in the range of 1:1 to 15:1.

In the preparation of the polyether-polyester block copolymer, the alkylene glycol component comprises at least one member selected from, for example, ethyleneglycol, propylene glycol, tetramethylene glycol, and decamethylene glycol, which have 2 to 10 carbon atoms, and the polyoxyalkyleneglycol component comprises at least one member selected from, for example, polyethylene glycol, polypropylene glycol, polyethylene glycol—polypropylene glycol copolymers, polyethylene glycol—polytetramethylene glycol copolymers, and monomethylethers monoethylethers and monophenylethers of the above-mentioned glycol compounds, which preferably have a number average molecular weight of from 400 to 10,000, more preferably 600 to 6,000.

Preferably the polyether-polyester block copolymer usable for the present invention has a number average molecular weight of from 2,000 to 20,000, more preferably from 3,000 to 10,000, which are variable depending on the molecular weight of the polyoxyalkyleneglycol component used.

The vinyl block copolymers containing polyether segments are, for example, polymerization products of a vinyl monomer of polyoxyalkyleneglycol derivatives having two or more acrylic or methacrylic acid radicals, having the following formulae:

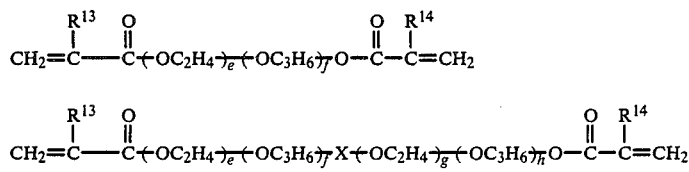

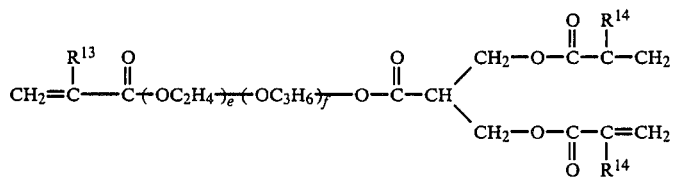

and

In the above formula, $R^{13}$ and $R^{14}$ respectively represent, independently from each other, a member selected from a hydrogen atom and methyl radical, X represents a divalent organic radical, and $\underline{e}$ and $\underline{g}$ respectively represent, independently from each other, an integer of 5 to 500, $\underline{f}$ represents zero or an integer lower than $\underline{e}$, and $\underline{h}$ represents zero or an integer lower than $\underline{g}$, that is, $0 \leq \underline{f} < \underline{e}$ and $0 \leq \underline{h} < \underline{g}$.

The vinyl block copolymers containing polyether segments are specifically obtained by polymerizing the following monomers.

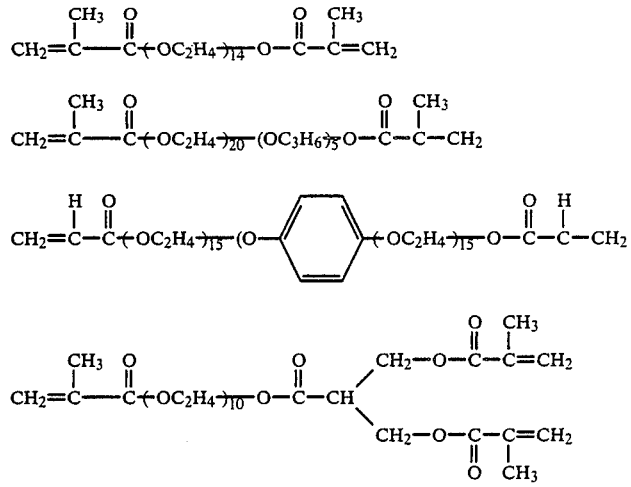

The above-mentioned hydrophilic resinous material is coated on the surface of the polyester fiber. When the polyester fiber is a hollow fiber, the inside surface of the polyester fiber may be coated with the hydrophilic resinous material.

The coating procedure for the hydrophilic resinous material can be effected by any known coating methods, for example, an immersion method, padding method, padding-steaming method, spraying method, radical polymerization method, ultraviolet-polymerization method, radiation polymerization method, electron beam polymerization method, and plasma polymerization method.

Preferably, a solution or dispersion of a polyether-polyester block copolymer, optionally containing a surface active agent, a salt and/or a pH-regulating agent, is applied to the surface of the polyester fiber, and the resultant coating layer is then solidified at an elevated temperature so that very fine particles or aggregates consisting of the polyether-polyester block copolymer are uniformly fixed on the surface of the polyester fiber. In the preparation of the solution or dispersion, the polyether-polyester block copolymer is dissolved or dispersed in water or a medium consisting of at least one non-aqueous liquid substance, for example, liquid paraffin, chloroform, benzylalcohol, methyl-alcohol, acetone or dioxane. Usually, water is preferably used as the solution or dispersion medium.

The coating layer of the polyether-polyester block copolymer can be formed on the polyester fiber surface by coating the polyester fiber surface with a solution or dispersion containing, for example, a vinyl monomer having polyether segments and a polymerization initiator consisting of, for example, ammonium persulfate, potassium perfsulfate, hydrogen peroxide or benzoyl peroxide, by heating the coating layer of the solution or dispersion to polymerize the vinyl monomer and to solidify the resultant polymer on the polyester fiber surface.

The amount of the hydrophilic resinous material to be applied to the polyester fiber surface is preferably in the range of from 0.05% to 7.0% by weight. If the amount of the hydrophilic resinous material is less than 0.05% by weight, it may be difficult to form a uniform coating membrance of the hydrophilic resinous material. Also, if the amount of the hydrophilic resinous material is more than 7.0% by weight, the resultant polyester fiber exhibits an unsatisfactory touch and quality.

The stainproof polyester fiber of the present invention exhibits an excellent stainproof property and a superior resistance to restaining while being laundered or washed. Also, the stainproof property of the polyester fiber of the present invention has an excellent durability. Therefore, the polyester fiber of the present invention is maintained in a clear (not darkened) appearance even after repeated washing and laundering. Accordingly, the fiber product comprising the stainproof polyester fiber of the present invention is useful for any purpose in which the fabric product is repeatedly laundered, for example, linen material usage.

The stainproof polyester fiber of the present invention is in the form of a staple (short fiber) or filament and is used for producing a non-woven fabric, woven fabric or knitted fabric wherein the stainproof polyester fiber of the present invention may be mixed with at least one other fiber, for example, natural fibers, such as cotton and wool; regenerated fibers, for example, rayon and cupra; semi-synthetic fibers, for example, cellulose acetate fiber; and synthetic fibers, for example, non-modified or modified polyster fiber, polyamide fiber and polyacrylic fiber. The present invention will be further explained by way of specific examples, which, however, are merely representative and do not restrict the scope of the present invention in any way.

In the examples, the following test were carried out.

(1) An inherent viscosity of a polyester polymer was calculated from a viscosity of the polymer measured in a solution of the polymer o-chlorophenol at a temperature of 35° C.

(2) A softening point of a polyester polymer was determined in accordance with a penetration method.

(3) Crystal size

A specimen was fixed on a fiber specimen stand of an X-ray diffrectometer (trademark: RAD-III A, made by Rigaku Denki Co.) and was set on a mount of a goniometer in a vertical direction. the X-ray diffraction of the specimen was measured at diffraction angles $\theta$ of 10 degrees to 40 degrees. On a X-ray diffraction chart, a straight line was drawn between the two lowest points of X-ray diffraction in a meridional direction. The straight line serves as base line. On the (100) plane and the (010) plane, half value widths of diffraction peaks were determined based on the base line. The crystal sizes on the (100) plane and the (010) plane were calculated in accordance with the equation:

$$D = A\lambda/(\sqrt{B - b}) \times \cos\theta$$

wherein D represents a crystal size, A represent a correction factor, $\lambda$ represents a wave length of X-ray of 1,5481 Å, and B represents the half value width of the diffraction peak.

(4) Staining test

An artificial staining liquid was prepared in the following composition.

| Component | Amount (% by weight) |
|---|---|
| Artificial staining material | 1 |
| Motor oil (trademark: Dia Queen Motor oil, made by Mitsubishi Car Industrial Co.) | 99.335% by weight |
| B heavy oil | 0.634% by weight |
| Carbon black | 0.031% by weight |
| Sodium alkylhenzene sulfonate | 0.02 |
| Sodium sulfate | 0.03 |
| Sodium tripolyphophate | 0.02 |
| Water | 98.93 |

The artifical staining liquid was placed in an amount of 300 ml in a treating pot of a dyeing test machine (Trademark: Colopet dyeing test machine, made by Nippon Dyeing Machine Co.). In the artificial staining liquid in the pot, a specimen consisting of a piece of polyester fiber fabric having a length of 13 cm and a width of 10 cm, and interposed by a holder was immersed and treated at a temperature of 50° C. for 100 minutes. The stained specimen was removed from the pot, washed with water, and then pressed betweens two pieces of fiber paper to remove water from the specimen. The stained specimen was placed in a home laundering machine and laundered in an aqueous solution of 2 g/l of marseilles soap at a temperature of 40° C. under weak conditions for 10 minutes. The laundered specimen was then air dried.

A cycle of treatment consisting of one staining operation and one laundering operation was repeatedly applied to the specimen (8 cycles). The degree of stain on the specimen was determined in the following manner.

The specimen was subjected to an ordinary measurement of L value in accordance with the CIE color specification system by means of a colorimeter (Trademark: Macbeth MS-2020, made by Instrumental Colour System Limited). The degree of staining was calculated from the equation $$\Delta L = L_0 - L$$

wherein $\Delta L$ represents the degree of staining of the specimen, $L_0$ represents an L value of a non-stained specimen, and L represents an L value of a stained and laundered specimen.

EXAMPLES 1 TO 4 AND COMPARATIVE EXAMPLES 1 TO 6

In each of Examples 1 to 4 and Comparative Examples 1 to 6 an ester-exchange reaction vessel was charged with a reaction mixture consisting of 100 parts by weight of dimethyl terephthalate, 60 parts by weight of ethylene glycol, 0.06 parts by weight of calcium acetate monohydrate (0.066 molar% based on the molar amount of the dimethyl terephthalate used) and 0.009 parts by weight of a color-controlling agent consisting of cobalt acetate tetrabutyrate (0.007 molar% based on the molar amount of the dimethyl terephthalate used). The reaction mixture was heated from the temperature of 140° C. to the temperature of 220° C. over a period of 4 hours to ester exchange the dimethyl terephthalate with ethylene glycol while the by-product consisting of methyl alcohol was distilled away to the outside of the reaction vessel. After the reaction was completed, 0.054 parts by weight of a stabilizer consisting of trimethyl phosphate (0.080 molar% based on the molar amount of the dimethyl terephthalate used) were added to the reaction product; and then, 10 minutes after the above-mentioned addition, 0.04 parts by weight of antimony trioxide (0.027 molar% based on the molar amount of the dimethyl terephthalate) were added to the reaction product. The reaction mixture was heated to a temperature of 240° C. while an excess amount of ethylene glycol was distilled away to the outside of the reaction vessel.

elongation of about 30%, by means of a heating roller heated at a temperature of 84° C. and a slit heater at a temperature of 180° C.

The resultant drawn, heat-treated filaments had a yarn count of 50 denier/24 filaments.

The filaments were converted to a tubular knitted fabric by an ordinary knitting process.

The fabric was secured and then heat treated at a temperature of 170° C. to remove creases formed on the fabric by the scouring process.

The fabric was then brightened with a treating liquid containing 2%, based on the weight of the fabric, of a fluoroescent brightening agent (Trademark: Mikawhite ATN, made by Mitsubishi chemical) at a temperature of 130° C. under a pressure for 30 minutes.

The brightened fabric was heat treated by an iron at the temperature and for the time shown in Table 3.

The heat treated fabric was subjected to the staining test, and the results are shown in Table 3. Preferably, the degree of staining ($\Delta L$) of the fabric is 30 or less, more preferably, 20 or less.

TABLE 3

| Example No. | | Comonomer | | Heat treatment (Ironing) | | Properties of copolymer and fiber | | | | | | | |
|---|---|---|---|---|---|---|---|---|---|---|---|---|---|
| | | | | | | | Crystal size | | | | | Degree of staining ($\Delta L$) | |
| | Item | Type | Amount (part by weight) | Temperature (°C.) | Time (sec) | Inherent viscosity [$\eta$] | (100) face | (010) face | Birefringence ($\Delta n$) | Ultimate elongation (%) | Tensile strength (g/d) | | Note |
| Example | 1 | M-PEG 1000 | 4 | 200 | 10 | 0.601 | 69 | 149 | 0.165 | 18 | 6.0 | 25.6 | — |
| | 2 | M-PEG 2000 | 4 | 200 | 10 | 0.629 | 68 | 147 | 0.160 | 17 | 6.7 | 18.9 | — |
| Comparative Example | 1 | M-PEG 2000 | 4 | 120 | 0.5 | 0.628 | 37 | 31 | 0.140 | 19 | 5.5 | 46.3 | — |
| | 2 | M-PEG 2000 | 4 | 160 | 45 | 0.629 | 45 | 49 | 0.149 | 23 | 5.1 | 38.4 | — |
| Example | 3 | M-PEG 3000 | 4 | 200 | 10 | 0.635 | 65 | 145 | 0.165 | 20 | 6.8 | 19.3 | — |
| | 4 | M-PEG 4000 | 4 | 200 | 10 | 0.628 | 55 | 138 | 0.168 | 21 | 6.3 | 24.8 | — |
| Comparative Example | 3 | M-PEG 6000 | 4 | 200 | 10 | 0.631 | 49 | 85 | 0.187 | 30 | 5.2 | 53.6 | Cloudy in polymerization step |
| | 4 | — | 0 | 200 | 10 | 0.636 | 43 | 78 | 0.183 | 28 | 5.3 | 59.3 | — |
| | 5 | PEG 2000 | 4 | 200 | 10 | 0.608 | 38 | 49 | 0.166 | 25 | 5.1 | 56.5 | — |
| | 6 | MM-PEG 2000 | 4 | 200 | 10 | 0.638 | 44 | 70 | 0.185 | 25 | 5.5 | 58.8 | — |

Note:
M-PEG: Polyoxyethyleneglycolmonomethylether The added number represents a number average molecular weight
PEG: Polyoxyethyleneglycol
MM-PEG: Polyoxyethylene glycol dimethylether Then, the resultant mixture was charged in a polymerization vessel and was added with the polyoxyethylene glycol compound of the type and in the amount as indicated in Table 3 to provide a copolymerization mixture.

The pressure in the polymerization vessel was reduced from 760 mmHg to 1 mmHg over a period of one hour and, simultaneously, the temperature of the copolymerization mixture was elevated from 240° C. to 280° C. over a period of 90 minutes.

The copolymerization mixture was heated at the temperature of 200° C. under the reduced pressure of 1 mmHg for 2 hours. Thereafter, the copolymerization mixture was added with 0.4 parts by weight of an antioxidant (Trademark: Irganox 1010, made by Ciba-Gaygy) under vacuum, and then further heated under the above-mentioned conditions for 30 minutes.

The resultant polyester copolymer was pelletized in accordance with ordinary procedures.

The pellets were dried by an ordinary process, and the dried pellets were melt-spun through a spinneret having 24 circular spinning holes each having a diameter of 0.3 mm at a temperature of 285° C. The resultant filaments were drawn and heat-treated to an extent such that the resultant drawn filaments exhibit an ultimate

EXAMPLE 5 AND COMPARATIVE EXAMPLES 7 AND 8

In Example 5, the same pellets as mentioned in Example 2, in Comparative Example 7, the same pellets as mentioned in Comparative Example 2, and in Comparative Example 8, the same pellets as mentioned in Comparative Example 3, were melt-spun at an extruding rate of 530 g/min at a temperature of 290° C. through a spinneret having 1008 circular spinning holes having a diameter of 0.28 mm. The resultant melt-spun filaments were oiled with an oiling agent and were then wound up at a speed of 1000 m/min.

The resultant undrawn filament yarns in an amount of 165 yarns were arranged in parallel to each other to form a row and then supplied to a drawing machine in which the filament yarns were drawn at a draw ratio of 3.74 in hot water at a temperature of 70° C. and then at a draw ratio of 1.15 in hot water at a temperature of 70° C. The drawn filament yarns were heat set at a temperature of 225° C. by means of a heat-setting roller and then oiled with a spinning oil at a speed of 100 m/min.

The oiled filament yarns were crimped by means of a stuffing box, dried in a continuous dryer at a temperature of 90° C., and finally, cut to a length of 38 mm by a cutter, to provide staple fibers. The properties of the resultant style fibers are indicated in Table 4.

The staple fibers in an amount of 65% by weight were blended with 35% by weight of cotton fibers and the blend was spun by an ordinary spinning machine to produce a blended yarn having a British cotton yarn count of 33 and a twist number of 17.8 turns/inch. The blended yarn was converted to a plain weave fabric.

The fabric was desized, scoured, heat-treated, and brightened with a aqueous solution of 2%, based on the weight of the fabric, of a fluoroescent brightening agent (trademark: Mikawhite ATN, made by Mitsubishi Chemical) at a temperature of 130° C. for 30 minutes by an ordinary process.

The brightened fabric was subjected to the staining test. The results are indicated in Table 4.

EXAMPLES 6 TO 9 AND COMPARATIVE EXAMPLES 9 TO 11

In each of Examples 6 to 9 and Comparative Examples 9 to 11, the same procedures as those described in Example 1 were carried out except that the polyethyleneglycol compound of the type and in the amount as shown in Table 5 was used; the organic polysilozane compound of the type and in the amount as shown in Table 5 was added together with the trimethyl phosphate to the ester-exchanged reaction mixture, in the heat treatment for the drawn filament yarns; the slit heater was replaced by a plate heater at a temperature of 180° C.; and the brightened fabric was heat set at a temperature of 160° C. for one minute.

Also, in the staining test, the artificial staining liquid had the following composition.

TABLE 4

| Example No. | Item | Comonomer Type | Amount (part by weight) | Heat treatment (Ironing) Temperature (°C.) | Time (sec) | Properties of copolymer and fiber Inherent viscosity [η] | Crystal size (100) face | Crystal size (010) face | Birefringence (Δn) | Specific gravity | Ultimate elongation (%) | Tensile strength (g/d) | Degree of staining of fabric |
|---|---|---|---|---|---|---|---|---|---|---|---|---|---|
| Example | 5 | M-PEG 2000 | 4 | 225 | 0.7 | 0.618 | 64 | 155 | 0.170 | 1.3937 | 17 | 6.6 | 5.6 |
| Comparative Example | 7 | PEG 2000 | 4 | 225 | 0.7 | 0.608 | 47 | 73 | 0.192 | 1.3901 | 18 | 5.3 | 18.3 |
| | 8 | MM-PEG 2000 | 4 | 225 | 0.7 | 0.628 | 49 | 85 | 0.186 | 1.3988 | 18 | 7.8 | 20.2 |

In Comparative Example 7, polyethyleneglycol having two terminal groups having an active hydrogen atom was copolymerized with a backbone polyester polymer. The resultant fiber had a relatively small size of crystals at the (100) and the (010) faces and a high degree of orientation (represented by birefringence), but the fiber exhibited a relatively small specific gravity. This small specific gravity suggested that the fiber had stretched amorphous segments and, therefore, was not provided with two different types of segments, crystalline segments and amorphous segments, clearly separated from each other. This internal structure of the comparative fabric caused the resultant fabric to exhibit an unsatisfactorily high degree of staining of 18.3.

In Comparative Example 8, two terminals of the polyethylene glycol were blocked by a methyl ether radical. Therefore, the two terminal-blocked polyethylene glycol did not copolymerize with the backbone polyester polymer and was easily extracted in the aqueous treating liquid. The resultant comparative fabric of Comparative Example 8 exhibited a high degree of staining of 20.2.

In Example 5, the one terminal blocked polythylene glycol was attached with the backbone polyester fiber. the resultant heat-streated fiber had a large crystal size and a very high degree of orientation and, therefore, contained clearly separated crystal segments and amorphous segments. The resultant fabric exhibited an excellent stainproof property.

| Component | Amount (% by weight) |
|---|---|
| Used motor oil | 1 |
| Sodium alkylhenzene sulfonate | 0.02 |
| Sodium sulfate | 0.03 |
| Sodium tripolyphosphate | 0.02 |
| Water | 98.93 |

The percentage of staining was determined as follows.

The test specimen was subjected to a measurement of reflectance thereof at a wavelength of 440 nm by means of an automatic recording spectrophotometer (trademark: RC-330, made by Shimazu Seisakusho). The percentage of staining of the specimen was calculated from the equation $$\text{Percentage of staining (\%)} = \frac{R_{f0} - R_f}{R_f} \times 100$$

wherein $R_{f0}$ represents a reflectance of non-stained fabric and $R_f$ represent a reflectance of stained fabric.

The hue of the resultant polyester copolymer was determined by a Hunter type color-differential meter. That is, an L-value and a b-value of the copolymer were determined. The larger the L-value, the higher the degree of whiteners of the copolymer. The larger the b value (on the positive side), the higher the degree of yellowness of the copolymer.

The results are shown in Table 5.

TABLE 5

| Example No. | Item | Polyoxyethylene glycol Type | Amount (part by weight) | Organic polysiloxane Type | Amount (part by weight) | Copolymer Inherent viscosity [η] | Softening point | Hue of copolymer L value | Hue of copolymer b value | Percentage of staining (%) After staining | Percentage of staining (%) After laundering |
|---|---|---|---|---|---|---|---|---|---|---|---|
| Example | 6 | M-PEG 2000 (n = 45) | 5 | | 0 | 0.629 | 262 | 66.8 | 1.5 | 77.3 | 38.6 |
| | 7 | M-PEG 2000 (n = 45) | 5 | KF-352 | 0.0024 | 0.602 | 262 | 66.5 | 1.2 | 76.1 | 21.8 |

TABLE 5-continued

| Example No. | Item | Polyoxyethylene glycol Type | Polyoxyethylene glycol Amount (part by weight) | Organic polysiloxane Type | Organic polysiloxane Amount (part by weight) | Copolymer Inherent viscosity [η] | Copolymer Softening point | Hue of copolymer L value | Hue of copolymer b value | Percentage of staining (%) After staining | Percentage of staining (%) After laundering |
|---|---|---|---|---|---|---|---|---|---|---|---|
| | 8 | M-PEG 4000 (n = 90) | 4 | KF-352 | 0.0024 | 0.631 | 262 | 67.2 | 3.5 | 75.2 | 20.1 |
| | 9 | M-PEG 4000 (n = 90) | 4 | KF-96 | 0.006 | 0.633 | 262 | 68.1 | 3.0 | 75.8 | 20.5 |
| Comparative Example | 9 | | 0 | KF-352 | 0.0024 | 0.640 | 263 | 63.1 | 1.1 | 81.8 | 62.3 |
| | 10 | PEG 2000 (n = 45) | 5 | KF-352 | 0.0024 | 0.608 | 260 | 66.4 | 5.1 | 77.5 | 59.5 |
| | 11 | MM-PEG 2000 (n = 45) | 5 | KF-352 | 0.0024 | 0.625 | 263 | 67.2 | 4.8 | 79.5 | 58.9 |

EXAMPLES 10 TO 15

In each of Example 10 to 15, the same procedures as those described in Example 1 were carried out with the following exception.

After the ester exchange reaction was completed, the organic polysiloxane of the type and in the amount as shown in Table 6 was added together with the trimethyl tripolyphophate to the ester exchange reaction mixture. After the polymerization mixture was placed in the polymerization vessel, the polyoxyalkylene glycol compound of the type and in the amount as shown in Table 6 was added to the polymerization mixture.

Also, 10 minutes after the stage at which the pressure in the polymerization vessel reached a level of 3 mmHg and the pressure-reducing operation was stopped, a quaternary onium salt of sulfonic acid of the type and in the amount as indicated in Table 6 was added to the polymerization mixture, and the pressure in the polymerization vessel was then further reduced to the level of 1 mmHg, and the polymerization procedure was carried out at a temperature of 280° C. for 2 hours.

The inherent viscosity, and the line (L value and b value) of the resultant copolymer were determined.

The resultant drawn filament yarn had a yarn count of 75 denier/24 filaments.

The second knitted fibric was pre-heat set at a temperature of 180° C. for 45 seconds and was treated with an aqueous alkali solution containing 3.5% by weight of sodium hydroxide at a boiling temperature of the solution to reduce the weight of the fabric by 20% by weight.

The pre-heat set fabric and the alkali-treated fabric were dyed with a dyeing solution containing 15%, based on the weight of each fabric, of a black dispense dye (trademark: Dianix Black HG-FS, made by Mitsubishi Chemical) at a temperature of 130° C. for 60 minutes. The dyed fabrics were treated with an aqueous solution containing 1 g/l of sodium hydroxide and 1 g/l of sodium dichionite (hydrosulfite) to reduction clarify the dyed fabrics. The dyed fabrics were black colored.

The dyed fabric was laundered with a laundering liquid containing 40 g of a usual detergent (trademark: Zabu) dissolved in 20 liters of hot water for 20 minutes by means of a home laundering machine and washed under a flow of water. The laundered fabrics were then dried.

The fabrics were subjected to measurements of antistatic property, darkness in hue, resistance to fibrillation, and decrease in tensile strength due to the alkali treatment.

The results are shown in Table 6.

The antistatic property of the fabric was represented by the triboelectrification potential, which was measured in the following manner.
(1) Tester Rotary static tester with oscilloscope
(2) Rubbing cloth Cotton plain weave cloth having a width of 2.5 cm and a length of 14 cm and consisting of cotton spun yarns having a yarn count of 30.

The rubbing cloth was scoured, bleached, and finished without sizing.
(3) Specimen
 (A) Width: 3.8 cm, Length: 30 cm This specimen was used for a winding test
 (B) Width: 4.0 cm, Length: 8.0 cm This specimen was used for a frame test
(4) Conditioning The specimens and rubbing clothes were conditioned in a desiccator at an RH of 50%±2° C. for one day or more.

The testing atmosphere was conditioned at a temperature of 20±2° C. and at an RH of 50±2%.

The specimens were used one by one; the rotary drum was rotated at a velocity of 700 r.p.m.; the triboelectrification equilibrium time was one minute; and a load was applied to the rubbing cloth to bring it into contact with the specimen.

The specimen was fixed on the periphery of the rotary drum so that the lower surface of the specimen came into contact with the periphery of the rotary drum. The rubbing cloth was fixed by two clips located under the drum so that the rubbing cloth was in contact with the specimen and they were parellel to each other. The specimen and rubbing cloth were subjected to a contact load of 600 g.

The recording meter was operated at a speed of 5 cm/min, the rotary drum was rotated, and the oscilloscope then operated.

When the triboelectrification reached equilibrium condition, the triboelectrification potential (volt) and pole value (+ or −) was measured. The test was repeated 3 times. The treiboelectrification potential of the specimen was represented by an average of the results of the repeated tests.

When the resultant triboelectrification potential was about 2000 volts or less, the antistatic propery of the specimen was satisfactory.

The darkness in hue of the dyed fabric was represented by a hue darkness value (K/S). this value was determined by measuring a spectral reflectance (R) of the dyed fabric at a wave length of 500 mm and then calculating the value in accordance with the Kubelka-Munk equation:

$$K/S = \frac{1-R}{2R}$$

wherein K represents an absorption coefficient and S represents a scattering coefficient of the fabric.

The resistance of the fabric to fibrillation was determined by rubbing a specimen 200 times with a rubbing cloth consisting of polyethylene terephthalate filament georgette crape under a load of 500 g by means of a GAKUSHIN type plain rubbing tester. The change in color of the specimen was evaluated with reference to the discoloration gray scale.

COMPARATIVE EXAMPLE 12

The same procedures as those described in Example 10 were carried out with the following exception.

Polyethylene terephthalate hemopolymer pellets were blended with 1.0% by weight of polyoxyethylene glycol having a number average molecular weight of 20,000 (dgree of polymerization of 455) and 0.5% by weight of sodium alkylenesulfonate having an average carbon atom number of 14. The blend was converted to hollow polyester filaments having a yarn count of 75 denier/24 filament and percentage of hollows of 8.

The results of the tests are shown in Table 6.

TABLE 6

| Example No. | Item | Polyoxyethylene glycol compound Type | Amount (part by weight) | Quaternary onium sulfonate Type | Amount (part by weight) | Organic polysiloxane Type | Amount (part by weight) | Copolymer Inherent viscosity [$\eta$] | Softening point (°C.) | Hue L value | Hue b value |
|---|---|---|---|---|---|---|---|---|---|---|---|
| Example | 10 | M PEG 2000 | 5 | Tetrabutyl-phosphonium alkylsulfonate | 0.5 | KF 352 | 0.024 | 0.641 | 261.9 | 67.0 | 4.2 |
|  | 11 | M PEG 4000 | 5 | Tetrabutyl-phosphonium alkylsulfonate | 0.5 | KF 352 | 0.024 | 0.640 | 262.2 | 68.1 | 5.0 |
|  | 12 | M PEG 2000 | 1 | Tetrabutyl-phosphonium alkylsulfonate | 0.2 | KF 352 | 0.024 | 0.638 | 262.4 | 69.5 | 3.5 |
|  | 13 | M PEG 2000 | 5 | Tetrabutyl-phosphonium dodecylbenzene sulfonate | 0.5 | KF 96 | 0.024 | 0.637 | 261.8 | 67.2 | 4.5 |
|  | 14 | M PEG 2000 | 5 | Tetraethyl-phosphonium alkylsulfonate | 0.5 | KF 352 | 0.024 | 0.637 | 262.0 | 66.8 | 4.5 |
|  | 15 | M PEG 2000 | 5 | Tetrabutyl-phosphonium alkylsulfonate | 0.5 | None | 0 | 0.641 | 261.8 | 67.2 | 4.3 |
| Comparative Example | 12 | PEG 2000 | 1 | Sodium alkylsulfonate | 0.5 | None | 0 | 0.636 | 262.0 | 66.1 | 5.5 |

| Example No. | Item | Triboelectrification potential (V) Non-alkali treated fabric (N = 0) | Triboelectrification potential (V) Alkali treated fabric (N = 20%) | Darkness of hue (K/S) Non-alkali treated fabric (N = 0) | Darkness of hue (K/S) Alkali treated fabric (N = 20%) | Fibrillation resistance (200 rubbing) Non-alkali treated fabric (N = 0) | Fibrillation resistance (200 rubbing) Alkali treated fabric (N = 20%) | Reduction in tensile strength by alkali treatment (%) |
|---|---|---|---|---|---|---|---|---|
| Example | 10 | 980 | 970 | 23.2 | 23.8 | 5 | 4–5 | 21.3 |
|  | 11 | 760 | 770 | 23.6 | 23.8 | 5 | 4–5 | 22.5 |
|  | 12 | 1030 | 1010 | 22.8 | 23.4 | 5 | 5 | 20.8 |
|  | 13 | 1250 | 1320 | 23.0 | 23.3 | 5 | 4–5 | 24.1 |
|  | 14 | 880 | 910 | 23.5 | 23.7 | 5 | 4–5 | 22.6 |
|  | 15 | 1210 | 1280 | 23.1 | 23.5 | 5 | 4–5 | 23.5 |
| Comparative Example | 12 | 1470 | 3720 | 21.8 | 19.6 | 4–5 | 3 | 35.1 |

Note:
N: Reduction in weight of fabric by alkali treatment

The fibrillation resistance was evaluated in five classes. Class 1 denotes a very poor resistance and class 5 denotes an excellent resistance. Class 4 and Class 5 are desirable for practical usage.

The reduction in tensile strength of the dyed fabric due to the alkali treatment was determined in the following manner.

Portions of the non-alkali treated fabric and alkali treated fabric were converted to fibres. The fibers were subjected to measurement of the tensile strength thereof.

The reduction (%) was represented by a ratio of a difference in tensile strength between the non-alkali treated fiber and the alkali treated fiber to that of the non-alkali treated fiber.

EXAMPLES 16 TO 20

In Example 16, the same procedures as those described in Example 10 were carried out except that the 0.5 part by weight of the tetrabutylphosphonium alkylsulfonate was replaced by 1.0 part by weight of sodium alkylsulfonate.

In Example 17, the same procedures as those in Example 16 were carried out except that an organic polysiloxane was not used.

In Example 18, the same procedures as those in Example 16 were carried out except that the M-PEG 2000 was replaced by M-PEG 4000.

In Example 19, the same procedures as those in Example 16 were carried out except that the M-PEG 2000 was used in an amount of 1 part by weight and sodium alkylsulfonate was used in an amount of 0.5 part by weight.

In Example 20, the same procedures as those in Example 16 were carried out except that 1 part by weight of sodium alkylsulfonate was replaced by 1 part by weight of sodium dodecylbenzenesulfonate and the organic polysiloxane KF-352 was replaced by KF-96, which consists of dimethylpolysiloxane having a viscosity of 300 cSt. at 25° C.

The results are shown in Table 7.

COMPARATIVE EXAMPLE 13

The same procedures as those in Example 16 were carried out except that the M-PEG 2000 was replaced by PEG 2000 (polyethyleneglycol having a molecular weight of 2000).

The results are shown in Table 7.

ple 1 were carried out except that when the polymerization mixture was placed in the polymerization vessel, 4 parts by weight of polyoxyethyleneglycol monophenylether (PH-PEG 2000) having a number average molecular weight of 2000 (a degree of polymerization of 43) were added to the polymerization mixture; the polyethylene terephthalate copolymer pellets were blended with the fluorescent brightening agent-containing master pellets so that the content of the fluorescent brightening agent in the resultant blend reached the level indicated in Table 8; and a portion of the resultant brightened fabric was subjected to the same staining test as that described in Example 5. Also, another portion of the brightened fabric was exposed to a Xenon weatherometer. The degree of fading (yellowing) was evaluated with reference to a fading gray scale. Very significant fading was graded as class 1. No fading was graded as

TABLE 7

| Example No. | Item | Polyoxyethylene glycol compound Type | Amount (part by weight) | Quaternary onium sulfonate Type | Amount (part by weight) | Organic polysiloxane Type | Amount (part by weight) | Inherent viscosity [η] | Softening point (°C.) | Hue L value | Hue b value |
|---|---|---|---|---|---|---|---|---|---|---|---|
| Example | 16 | M-PEG 2000 | 5 | Sodium alkylsulfonate | 1.0 | KF-352 | 0.024 | 0.631 | 261.6 | 66.1 | 7.3 |
|  | 17 | M-PEG 2000 | 5 | " | 1.0 | none | 0 | 0.628 | 261.5 | 66.2 | 7.2 |
|  | 18 | M-PEG 4000 | 5 | " | 1.0 | KF-352 | 0.024 | 0.636 | 261.6 | 66.3 | 8.1 |
|  | 17 | M-PEG 2000 | 1 | " | 0.5 | " | 0.024 | 0.639 | 261.5 | 63.9 | 1.9 |
|  | 20 | M-PEG 2000 | 5 | Sodium dodecylbenzenesulfonate | 1.0 | KF-96 | 0.024 | 0.625 | 261.7 | 65.7 | 6.8 |
| Comparative Example | 13 | PEG 2000 | 5 | Sodium alkylsulfonate | 1.0 | KF-352 | 0.024 | 0.647 | 260.6 | 66.2 | 7.8 |

| Example No. | Item | Triboelectrification potential (V) Non-alkali treated fabric (N = 0) | Triboelectrification potential (V) Alkali treated fabric (N = 20%) | Darkness of hue (K/S) Non-alkali treated fabric (N = 0) | Darkness of hue (K/S) Alkali treated fabric (N = 20%) | Fibrillation resistance (200 rubbing) Non-alkali treated fabric (N = 0) | Fibrillation resistance (200 rubbing) Alkali treated fabric (N = 20%) | Reduction in tensile strength by alkali treatment (%) |
|---|---|---|---|---|---|---|---|---|
| Example | 16 | 1180 | 1150 | 23.1 | 22.5 | 5 | 4 | 24.1 |
|  | 17 | 1380 | 1440 | 23.4 | 22.8 | 5 | 4 | 25.0 |
|  | 18 | 920 | 880 | 23.8 | 23.1 | 5 | 4 | 24.8 |
|  | 17 | 1220 | 1200 | 22.6 | 23.0 | 5 | 4-5 | 20.8 |
|  | 20 | 1710 | 1850 | 23.0 | 22.8 | 5 | 4 | 23.9 |
| Comparative Example | 13 | 2400 | 4540 | 23.0 | 22.4 | 4-5 | 3-4 | 31.4 |

EXAMPLES 21 TO 26 AND COMPARISON EXAMPLES 14 TO 16

In each of Examples 21 to 26 and Comparative Examples 14 to 16, fluorescent brightening agent-containing master pellets were produced by dry blending 3.5 parts by weight of 4,4′-bis(benzoxazolyl)stilbene powder with 96.5 parts by weight of dried polyethylene terephthalate pellets having a limiting viscosity number of 0.640 and a softening point of 263° C. for 5 minutes in a Nauta mixer, and by mix-extruding the blend at a temperature of 275° C. by means of a biaxial extruder, the extruder stream of the blend in the form of strands being immersed in water to cool and to solidify, and by cutting the solidified strands to provide master pellets containing 3.5% by weight of the fluorescent brightening agent.

In each of Examples 21 to 24 and Comparative Example 14, the same procedures as those described in Example 1 were carried out except that when the polymerization mixture was placed in the polymerization vessel, 4 parts by weight of polyoxyethyleneglycol monophenylether (PH-PEG 2000) having a number average molecular weight of 2000 (a degree of polymerization of 43) were added to the polymerization mixture; the polyethylene terephthalate copolymer pellets were blended with the fluorescent brightening agent-containing master pellets so that the content of the fluorescent brightening agent in the resultant blend reached the level indicated in Table 8; and a portion of the resultant brightened fabric was subjected to the same staining test as that described in Example 5. Also, another portion of the brightened fabric was exposed to a Xenon weatherometer. The degree of fading (yellowing) was evaluated with reference to a fading gray scale. Very significant fading was graded as class 1. No fading was graded as class 5. Desirably, the fading of the brightened fabric was within the range of from class 4 to class 5.

In Example 25, the same procedures as those described in Example 21 were carried out except that 4 parts by weight of polyoxyethyleneglycol monophenylether were replaced by 4 parts by weight of polyoxyethyleneglycol monomethylether having a number average molecular weight of 3000 (a degree of polymerization of 67).

In Example 26, the same procedures as those described in Example 21 were effected except that the fluorescent brightening agent consisted of 4-(benzoxazolyl)-4′-(5-methylbenzoxazolyl)stilbene in place of 4,4′-bis(benzoxazolyl)stilbene.

In Comparative Example 15, the same procedures as those described in Example 21 were conducted except that the 4,4′-(benzoxazolyl)stilbene was replaced by the triazinylstilbene compound of the formula:

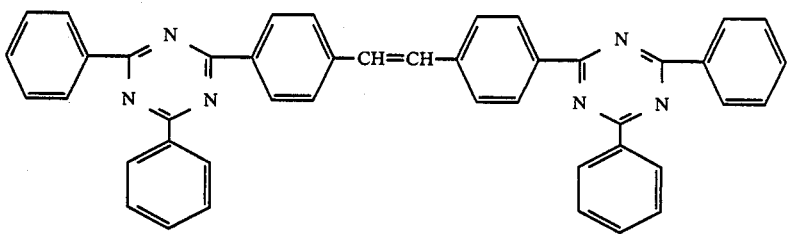

In Comparative Example 16, the same procedures as those described in Example 21 were carried out except that polyoxyalkyleneglycol monophenylether was not added.

The results are shown in Table 8.

of 80 molar% of dimethyl terephthalate and 20 molar% of dimethyl isophthalate was copolymerized with a glycol component consisting of 2.7 molar parts of ethylene glycol and 7 molar parts of polyethyleneglycol having a number average molecular weight of 3100.

TABLE 8

| Example No. | Item | PH-PEG-Containing polyester copolymer | | | | Content of fluorescent brightening agent (% by weight) | Percentage of staining | | Weather fastness (Class) |
|---|---|---|---|---|---|---|---|---|---|
| | | Inherent viscosity [η] | Softening point (°C.) | Hue L value | Hue b value | | After staining treatment | After laundering | |
| Comparative Example | 14 | 0.636 | 262 | 67.1 | 2.5 | 0 | 78.5 | 22.3 | 5 |
| Example | 21 | 0.636 | 262 | 67.1 | 2.5 | 0.01 | 78.3 | 11.7 | 5 |
| | 22 | 0.636 | 262 | 67.1 | 2.5 | 0.035 | 77.6 | 10.6 | 5 |
| | 23 | 0.636 | 262 | 67.1 | 2.5 | 0.5 | 77.0 | 9.8 | 5 |
| | 24 | 0.636 | 262 | 67.1 | 2.5 | 1.0 | 75.4 | 9.5 | 5 |
| | 25 | 0.632 | 261 | 66.5 | 3.2 | 0.035 | 76.9 | 11.5 | 5 |
| | 26 | 0.636 | 262 | 67.1 | 2.5 | 0.035 | 77.8 | 12.4 | 5 |
| Comparative Example | 15 | 0.636 | 262 | 67.1 | 2.5 | 0.035 | 76.9 | 22.5 | 3 |
| | 16 | 0.640 | 262 | 66.5 | 1.2 | 0.035 | 79.8 | 57.3 | 5 |

EXAMPLES 27 TO 29 AND COMPARATIVE EXAMPLES 17 TO 19

In each of Examples 27 to 29 and Comparative Examples 17 to 19, the same procedures for preparing the brightened, heat treated polyester copolymer fiber fabric as those described in Example 5 were carried out, except that the organic polysiloxane of the type and in the amount as shown in Table 9 was blended and the polyoxyethyleneglycol compound of the type and in the amount as indicated in Table 9 was copolymerized.

A portion of the scoured, heat treated fabric was brightened with a brightening liquid containing 2%, based on the weight of the fabric, of a fluorescent brightening agent (trademark: Mikawhite ATN, made by Mitsubishi Chemical) at a temperature of 130° C. for 30 minutes. The brightened fabric was heat treated at a temperature of 160° C. for one minutes. This brightened, heat treated fabric is referred to as fabric No. 1.

Separately, another portion of the scoured, heat treated fabric was treated in the following manner. One molar part of a dicarboxylic acid compound consisting The resultant hydrophilic copolymer was dispersed in an concentration of 10% by weight in water in the presence of a surface active agent prepared by modifying an addition product of 6 molar parts of ethylene oxide to one molar part of nonylphenol with a sodium sulfonate radical attached thereto.

The portion of the scoured, heat treated fabric was treated with a treating liquid containing 10%, based on the weight of the fabric, of the above-mentioned copolymer-containing aqueous dispersion, 2%, base on the weight of the fabric, of a fluorescent brightening agent (Mikawhite ATN), 0.2 ml/l of acetic acid, and 0.3 g/l of sodium acetate at a liquor ratio of 1:30 at a temperature of 130° C. for 30 minutes. The treated fabric having a hydrophilic copolymer coating was dried and heat treated at a temperature of 160° C. for one minute. This hydrophilic copolymer-treated, heat treated fabric is referred to as fabric No. 2.

The above-mentioned fabric Nos. 1 and 2 were subjected to the same staining test as that described in Example 5.

The results are indicated in Table 9.

TABLE 9

| Example No. | Item | Polyoxyethylene glycol comonomer | | Organic polysiloxane | | Copolymer | |
|---|---|---|---|---|---|---|---|
| | | Type | Amount (part by weight) | Type | Amount (part by weight) | Inherent viscosity [η] | Softening point (°C.) |
| Example | 27 | M-PEG 2000 (n = 45) | 5 | None | 0 | 0.629 | 262 |
| | 28 | M-PEG 2000 (n = 45) | 5 | KF-352 | 0.0024 | 0.602 | 262 |
| | 29 | M-PEG 4000 (n = 90) | 4 | KF-352 | 0.0024 | 0.631 | 262 |
| Comparative Example | 17 | None | 0 | None | 0 | 0.636 | 263 |
| | 18 | PEG 2000 (n = 45) | 5 | KF-352 | 0.0024 | 0.608 | 260 |

TABLE 9-continued

| Example No. | Item | Hue L value | Hue b value | Fabric No. 1 (no hydrophilic coating) After staining treatment | Fabric No. 1 After laundering | Fabric No. 2 with hydrophilic coating After staining treatment | Fabric No. 2 After laundering |
|---|---|---|---|---|---|---|---|
| | 19 | MM-PEG 2000 (n = 45) | 5 | KF-352 | 0.0024 | 0.625 | 263 |
| Example | 27 | 66.8 | 1.5 | 77.3 | 38.6 | 67.2 | 11.9 |
| | 28 | 66.5 | 1.2 | 78.0 | 22.0 | 66.5 | 7.6 |
| | 29 | 67.2 | 3.5 | 79.2 | 24.6 | 68.0 | 9.1 |
| Comparative | 17 | 62.0 | 1.2 | 81.8 | 62.3 | 71.0 | 20.5 |
| Example | 18 | 66.4 | 5.1 | 76.0 | 59.5 | 67.3 | 18.6 |
| | 19 | 67.2 | 4.8 | 77.2 | 58.9 | 68.7 | 19.1 |

We claim:

1. A stainproof polyester fiber comprising at least one fiber-forming polyester copolymer comprising: a backbone polyester chain; and at least one type of terminal substituents which block at least some of terminals of the molecules of the backbone polyester and which substituents consist of a polyoxyalkyleneglycol monoether groups of the Formula (I):

$$R^1-O(R^2O)_n \quad (I)$$

wherein $R^1$ represents a monovalent organic radical free from active hydrogen atom, $R^2$ represents an alkylene radical, and $n$ represents a positive integer of 2 or more, said polyester fiber being composed of crystalline segments in which the backbone polyester chains of the copolymer are concentrated and amorphous segments in which the polyoxyalkyleneglycol monoether groups of the copolymer are concentrated to form a two block segment-containing micelle stainproof structure, and having a crystal size at a (100) plane of 50 to 100 angstroms, a crystal size at a (010) plane of 65 to 170 angstroms, and a birefringence of 0.15 or more.

2. The stainproof polyester fiber as claimed in claim 1, wherein the backbone polyester polymer is derived from a polymerization product of a dicarboxylic acid component with an alkyl glycol component and the polyoxyalkyleneglycol monoether group is in an amount of 0.01 to 4.0 molar% based on the molar amount of the dicarboxylic acid component.

3. The stainproof polyester fiber as claimed in claim 1, wherein the monovalent organic radical represented by $R^1$ in the formula (I) is selected from the group consisting of alkyl radicals, aryl radicals and alkylaryl radicals free from active hydrogen atom.

4. The stainproof polyester fiber as claimed in claim 1, wherein the alkylene radical represented by $R^2$ in the formula (I) has 2 to 4 carbon atoms.

5. The stainproof polyester fiber as claimed in claim 1, wherein in the formula (I), $n$ represents an integer of 20 to 140.

6. The stainproof polyester fiber as claimed in claim 1, wherein the polyoxyalkyleneglycol monoether is selected from the group consisting of polyoxyethyleneglycolmonomethylether, polyoxyethyleneglycolmonophenylether, polyoxyethyleneglycolmonooctylphenylether, polyoxyethyleneglycolmonononylphenylether, polyoxyethyleneglycolmonocetylether, polyoxypropyleneglycolmonophenylether, polyoxypropyleneglycolmonooctylphenylether, polyoxypropyleneglycolmonononylphenylether, polyoxypropyleneglycolmonocetylphenylether, polyoxytetramethyleneglycolmonomethylether, monomethylethers of polyoxyethyleneglycol-polyoxypropyleneglycol copolymers.

7. The stainproof polyester fiber as claimed in claim 1, wherein the polyalkyleneglycol monoether group is in a content of 0.5 to 10% by weight based on the weight of the polyester copolymer.

8. The stainproof polyester fibers as claimed in claim 1, wherein the fiber has an ultimate elongation of 40% or less, and a tensile strength of 4 g/d.

9. The stainproof polyester fiber as claimed in claim 1, which fiber further comprises, in addition to the fiber-forming polyester copolymer, an additive consisting of at least one member selected from the group consisting of organic polysiloxanes, quaternary onium salts of organic sulfonic acids, metal salts of organic sulfonic acids which are not reactive to the polyester copolymer.

10. The stainproof polyester fiber as claimed in claim 9, wherein the organic polysiloxanes are in an amount of 0.001% by weight or more based on the weight of the polyester copolymer.

11. The stainproof polyester fiber as calimed in claim 9, wherein the quaternary onium salts of organic sulfonic acids is in an amount of 0.01 to 2.0% by weight based on the weight of the polyester copolymer.

12. The stainproof polyester fiber as claimed in claim 11, wherein the metal salts of organic sulfonic acids are in an amount of 0.01 to 2.0% by weight based on the weight of the polyester copolymer.

13. The stainproof polyester fiber as claimed in claim 1, wherein the fiber further contains, in addition to the fiber-forming polyester copolymer, a fluorescent brightening agent consisting of at least one stilbene compound of the formula (VI):

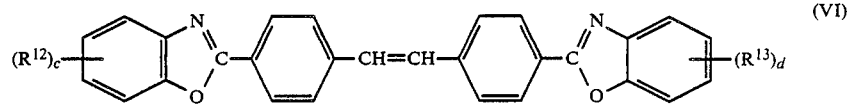

wherein $R^{12}$ and $R^{13}$ respectively represent a member selected from the group consisting of a hydrogen atom, halogen atoms, alkyl radicals, alkoxy radicals and aryl radicals, and c and d respectively represent an integer of 1 to 2.

14. The stainproof polyester fiber as claimed in claim 13, wherein the stilbene compound is 4,4'-bis(benzooxazolyl)stilbene.

15. The stainproof polyester fiber as claimed in claim 1, wherein the backbone polyester polymer is a polymerization product of an aromatic dicarboxylic component comprising, as a major ingredient, terephthalic acid or its anhydride with a glycol component comprising at least one alkylene glycol having 2 to 6 carbon atoms.

* * * * *